(12) United States Patent
Kinoshita et al.

(10) Patent No.: US 7,434,870 B2
(45) Date of Patent: Oct. 14, 2008

(54) FRONT STRUCTURE OF VEHICLE

(75) Inventors: Yuuji Kinoshita, Tokyo (JP); Teruyuki Taura, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 11/769,061

(22) Filed: Jun. 27, 2007

(65) Prior Publication Data

US 2008/0007083 A1    Jan. 10, 2008

(30) Foreign Application Priority Data

Jun. 27, 2006  (JP) .............................. 2006-175967
Oct. 6, 2006   (JP) .............................. 2006-275525

(51) Int. Cl.
    *B62D 25/02*    (2006.01)
(52) U.S. Cl. .................... 296/193.06; 296/202; 296/93; 296/201
(58) Field of Classification Search .............. 296/146.9, 296/93, 193.06, 201, 203.03, 205, 202
    See application file for complete search history.

(56) References Cited

U.S. PATENT DOCUMENTS 4,496,186 A    1/1985   Tuchiya et al.
4,518,197 A    5/1985   Gallitzendorfer et al.
4,653,801 A *  3/1987   Shirasu et al. .............. 296/202

FOREIGN PATENT DOCUMENTS

| DE | 35 45 832 C2  |   | 7/1986 |
| DE | 199 39 462 B4 |   | 3/2005 |
| EP | 0 058 599     | * | 5/1982 |
| JP | 2006-096270   |   | 4/2006 |

* cited by examiner

*Primary Examiner*—Joseph D Pape
(74) *Attorney, Agent, or Firm*—Duane Morris LLP

(57) ABSTRACT

It is an object of the present invention that bringing a door weather strip into contact with a side molding restrains dusts and the like from intruding into a gap between a front pillar and a side door. A front pillar (17) is provided between a side portion of a windshield glass (13) and a front portion of a side door (14), and an upper molding made of a resin is fitted to an upper part of the windshield glass (13). Also, a side molding (28) made of a resin is fitted to a side portion (13*b*) of the windshield glass (13), and the inner surface of the side portion (13*b*) of the windshield glass (13) is bonded to the front pillar (17). Moreover, a door weather strip (31) is provided along the front portion of the side door (14), and the door weather strip (31) is constructed so as to be brought into contact with the side molding (28).

6 Claims, 8 Drawing Sheets

FRONT STRUCTURE OF VEHICLE

BACKGROUND OF THE INVENTION

1. Field of the Invention

The present invention relates to a structure of a front corner portion in which a front pillar is provided between a windshield glass side portion and a side door front portion in a vehicle such as a truck, a passenger car, a bus and the like.

2. Description of the Related Art

In the prior art, there has been disclosed a front structure of a vehicle in which a front corner member extending along a side portion of a windshield glass and a front portion of a side glass is provided between the side portion of the windshield glass and the front portion of the side glass and the width of the front corner member is 40 to 58 mm when viewed by a driver seated in a driver's seat of the vehicle (for example, refer to patent Document 1). In this front structure of a vehicle, the front corner member comprises by a front pillar, a door frame, a glass frame and a glass run and the front pillar is formed in a cylindrical shape by bonding both side portions of a pillar inner panel and both side portions of a pillar outer panel. The pillar inner panel has a pillar inner body provided along the visual line direction of a driver seated in a driver's seat of a truck, a first front flange formed integrally with the pillar inner body at the front portion of the pillar inner body, and a first rear flange formed integrally with the pillar inner body at the rear portion of the pillar inner body. Also, the pillar outer panel has a pillar outer body provided substantially opposite to the front face of the door frame, a second front flange formed integrally with the pillar outer body at the front portion of the pillar outer body, and a second rear flange formed integrally with the pillar outer body at the rear portion of the pillar outer body. A front overlap portion is formed by bonding the pillar outer surface of the first front flange and the pillar inner surface of the second front flange. Also, an adhesive is filled in a gap between the front overlap portion and the inner surface of the windshield glass, and the side portion of the windshield glass is mounted to the front pillar by this adhesive. Moreover, a molding is fitted to the outer periphery portion of the glass in order to improve appearance of the outer periphery portion of the windshield glass.

In the front structure of a vehicle constructed as above, the width of the front corner member is 40 to 58 mm when viewed from a driver seated in a driver's seat of the vehicle. Therefore, when the driver of the vehicle focuses his both eyes to a target outside diagonally right in front of the vehicle in order to turn right at an intersection, for example, the relatively narrow front corner member close to him looks blurred due to parallax, and the target beyond the front corner member is not obstructed by the front corner member and thereby the driver can see a continuous visual field from the front of the vehicle to the right side. As a result, the driver of the vehicle does not have to move his upper body right or left in order to visually check the target beyond the front corner member but the driver can surely check the target outside the vehicle visually only by looking straight in the direction of the front corner member by moving only his head.

Patent Document 1

Japanese Unexamined Patent Application Publication No. 2006-96270 (claim 1, paragraphs [0007], [0008], [0011] to [0013])

In the front structure of a vehicle shown in the above prior-art Patent Document 1, an upper molding is fitted to an upper part of the windshield glass, a side molding is fitted to a side part of the windshield glass, and a weather strip to block dusts, rainwater and the like from entering a gap between the front pillar and the door frame is attached at a rear overlap portion. Since this weather strip is provided deep in the gap between the front pillar and the door frame, that is, on the side closer to a cabin, between the front pillar and the door frame, dusts, rain water and the like easily intrudes into a gap between the front pillar and the door frame through the gap between the side molding and the door frame, by which exposed surfaces of the front pillar and the door frame can easily get dusty.

SUMMARY OF THE INVENTION

A first object of the present invention is to provide a front structure of a vehicle wherein bringing a door weather strip into contact with a side molding allows prevention of dusts and the like from intruding into a gap between a front pillar and a side door.

A second object of the present invention is to provide a front structure of a vehicle wherein setting an outer surface of a side connection portion of the side molding at a predetermined angle allows reduction of a wind noise during driving and prevent the side door from interfering with a side connection portion at the time of opening/closing of the side door.

A third object of the present invention is to provide a front structure of a vehicle wherein sealing the gap between the front pillar and the side door by adopting a double structure of a main seal portion and an auxiliary seal portion of the door weather strip allows surely preventing dusts and the like from intruding into a cabin.

A fourth object of the present invention is to provide a front structure of a vehicle wherein smooth connection between the upper end of the side molding and a side surface of a roof member by using an extension piece allows improvement in an appearance of an upper end of the side molding when the side door is open.

A fifth object of the present invention is to provide a front structure of a vehicle wherein continuing the seal line of the door weather strip from the side molding to the side surface of the roof member serving as a body surface allows securing of a seal line and improvement in its sealing performance.

A sixth object of the present invention is to provide a front structure of a vehicle wherein making the extension piece easy to bend at an easily flexible portion facilitates the roof member to follow the side surface.

An invention of claim 1 is improvement of a front structure of a vehicle, as shown in FIGS. 1 to 3, in which a front pillar 17 is provided between a side portion of a windshield glass 13 and a front portion of a side door 14, an upper molding 29 made of a resin is fitted to an upper portion 13c of the windshield glass 13, a side molding 28 made of a resin is fitted to a side portion 13b of the windshield glass 13, and the inner surface of the side portion 13b of the windshield glass 13 is bonded to the front pillar 17.

Its characteristic construction is that a door weather strip 31 is provided along the front portion of the side door 14, and the door weather strip 31 is constructed so as to be brought into contact with the side molding 28.

In the front structure of a vehicle described in claim 1, the door weather strip 31 is brought into contact with the side molding 28. Therefore, dusts and the like having intruded into the gap between the side molding 28 and the side door 14 are blocked by the door weather strip 31 and do not intrude into the gap between the front pillar 17 and the side door 14. Also, since the door weather strip 31 is brought into contact with the side molding 28 made of a resin, accuracy of the contact face is improved as compared with the accuracy in case of contacting with a steel plate, its adhesion becomes favorable and the sealing performance can be improved.

Also, it is preferable that the side molding 28 has a side outer portion 28a covering the outer surface of the side portion 13b of the windshield glass 13, a side inner portion 28b covering the inner surface of the side portion 13b of the windshield glass 13, and a side connection portion 28c covering the end face of the side portion 13b of the windshield glass 13, and the door weather strip 31 is constructed so as to be brought into contact with the side connection portion 28c of the side molding 28.

An invention according to claim 3 is related to claim 2 and further shown in FIGS. 1 and 2, in which an angle $\theta_1$ made by the visible outline of the side connection portion 28c in the cross section of the side connection portion 28c and a horizontal line extending in the vehicle width direction is set so as to be smaller than $\theta_0$ made by a straight line in parallel with the outer surface of the side portion 13b of the windshield glass 13 and the horizontal line.

In the structure of claim 3, since the visible outline of the side connection portion 28c in the cross section of the side connection portion 28c is set at a predetermined angle, that is, the outer surface of the side portion 28c of the side molding 28 is set at a predetermined angle, the gap between the side molding 28 and the side door 14 is made smaller.

An invention of claim 4 is related to claim 1 and further shown in FIGS. 1 and 2, in which the door weather strip 31 has a main seal portion 31b to be brought into contact with the side molding 28 and an auxiliary seal portion 31c to be brought into contact with the front pillar 17.

In the front structure of a vehicle described in claim 4, since the gap between the front pillar 17 and the side door 14 is sealed by adopting a double structure of the main seal portion 31b and the auxiliary seal portion 31c of the door weather strip 31, intrusion of dusts and the like into a cabin can be surely prevented.

An invention of claim 5 is related to claim 2 and further shown in FIGS. 5 and 7, in which a roof member 32 is bonded to the upper end of the front pillar 17, an extension piece 28g along a side surface 32a of the roof member 32 is provided at the upper end of the side connection portion 28c of the side molding 28, and the extension piece 28g is formed so that the upper end of the side connection portion 28c can be smoothly connected to the side face 32a of the roof member.

In the front structure of a vehicle described in claim 5, since the upper end of the side molding 28 and the side surface 32a of the roof member 32 are connected smoothly by the extension piece 28g, an appearance of the upper end of the side molding can be improved when the side door is open, a seal line of the door weather strip can be ensured, and its sealing performance can be improved.

An invention according to claim 6 is related to claim 5 and further shown in FIGS. 1, 5 and 6, in which an easily flexible portion 28h for giving flexibility to the extension piece 28g is provided.

In the front structure of a vehicle described in claim 6, since the easily flexible portion 28h is provided at the extension piece 28g, the extension 28g is easy to bend to easily follow the side surface of the roof member 32. Also, since the door weather strip 31 is brought into contact with the side molding 28, dusts and the like having intruded into the gap between the side molding 28 and the side door 14 are blocked by the door weather strip 31 and do not intrude into the gap between the front pillar 17 and the side door 14.

In the present invention, the door weather strip is provided along the front portion of the side door and the door weather strip is constructed so as to be brought into contact with the side molding. Therefore, dusts and the like having intruded into the gap between the side molding and the door frame do not intrude into the gap between the front pillar and the door frame, but are blocked by the door weather strip. As a result, the exposed surfaces of the front pillar and the door frame hardly get dusty. Also, since the door weather strip is brought into contact with the side molding made of a resin, its adhesion becomes favorable and sealing performance can be improved.

Also, if an angle made by the visible outline of the side connection portion in the cross section of the side connection portion and the horizontal line extending in the vehicle width direction is set so as to be smaller than an angle made by the straight line in parallel with the outer surface of the side portion of the windshield glass and the horizontal line, the gap between the side molding and the side door can be made smaller. As a result, a wind noise during driving can be reduced, and interference of the side door with the side connection portion can be prevented when the side door is opened/closed.

Moreover, the main seal portion of the door weather strip is brought into contact with the side molding and the auxiliary seal portion is brought into contact with the front pillar, the gap between the front pillar and the side door can be sealed doubly by the main seal portion and the auxiliary seal portion. As a result, intrusion of dusts and the like into the cabin can be surely prevented.

Further, If the roof member is bonded to the upper end of the front pillar and the extension piece along the side surface of the roof member is provided at the upper end of the side molding, the upper end of the side molding can be smoothly connected to the side surface of the roof member by the extension piece. As a result, the appearance of the upper end of the side molding can be improved when the side door is open.

Furthermore, if the easily flexible portion is provided at the extension piece, the extension piece••can be bent easily, so that the extension piece can easily follow the side surface of the roof member. As a result, the sealing performance of the door weather strip can be the more improved.

DETAILED DESCRIPTION OF THE PREFERRED EMBODIMENTS

Preferred embodiments according to the present invention will be described below based on the attached drawings.

Figure 1:
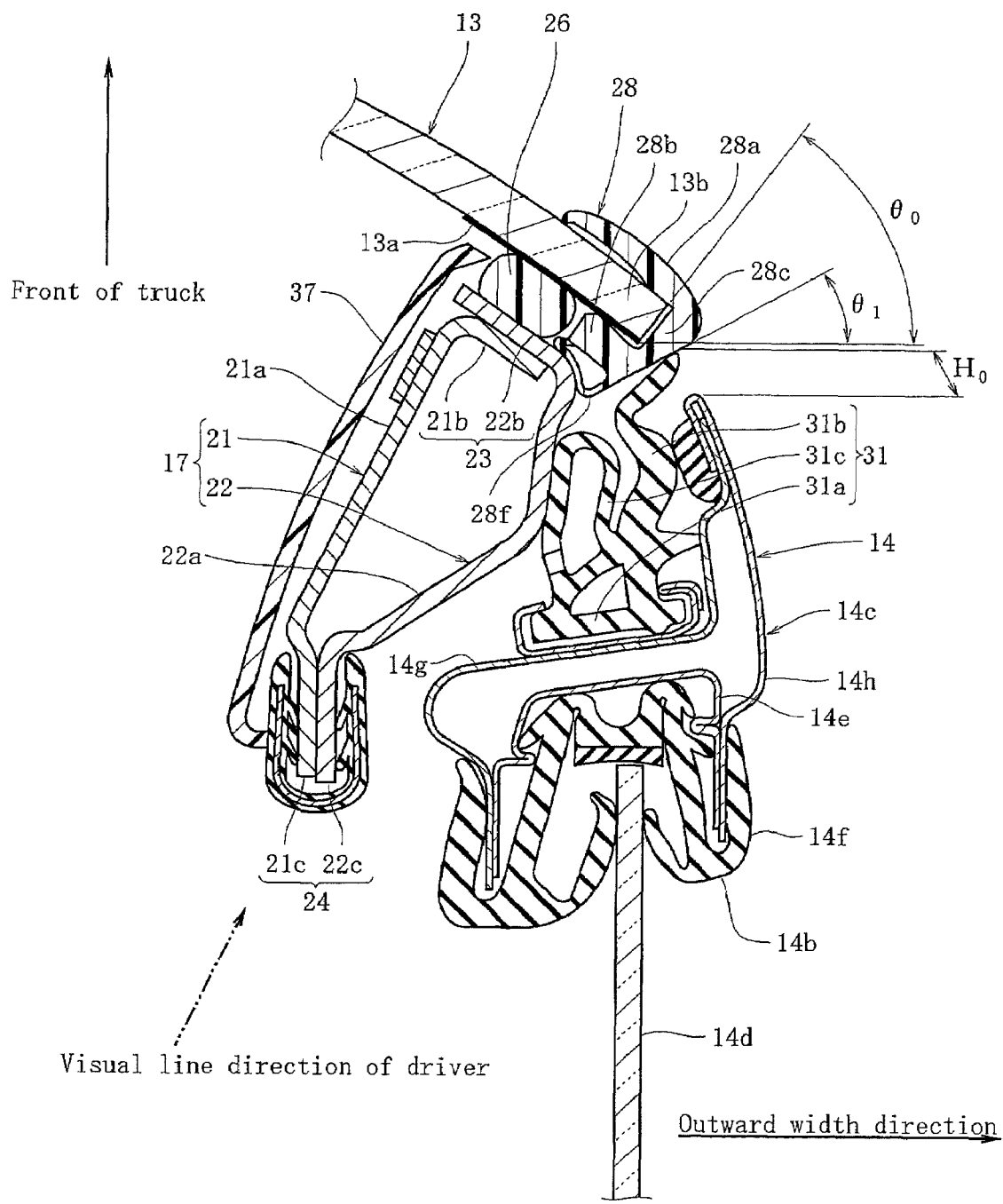
FIG. 1 is an A-A sectional view of FIG. 8 illustrating a front structure of a vehicle according to an embodiment of the present invention.
Figure 2:
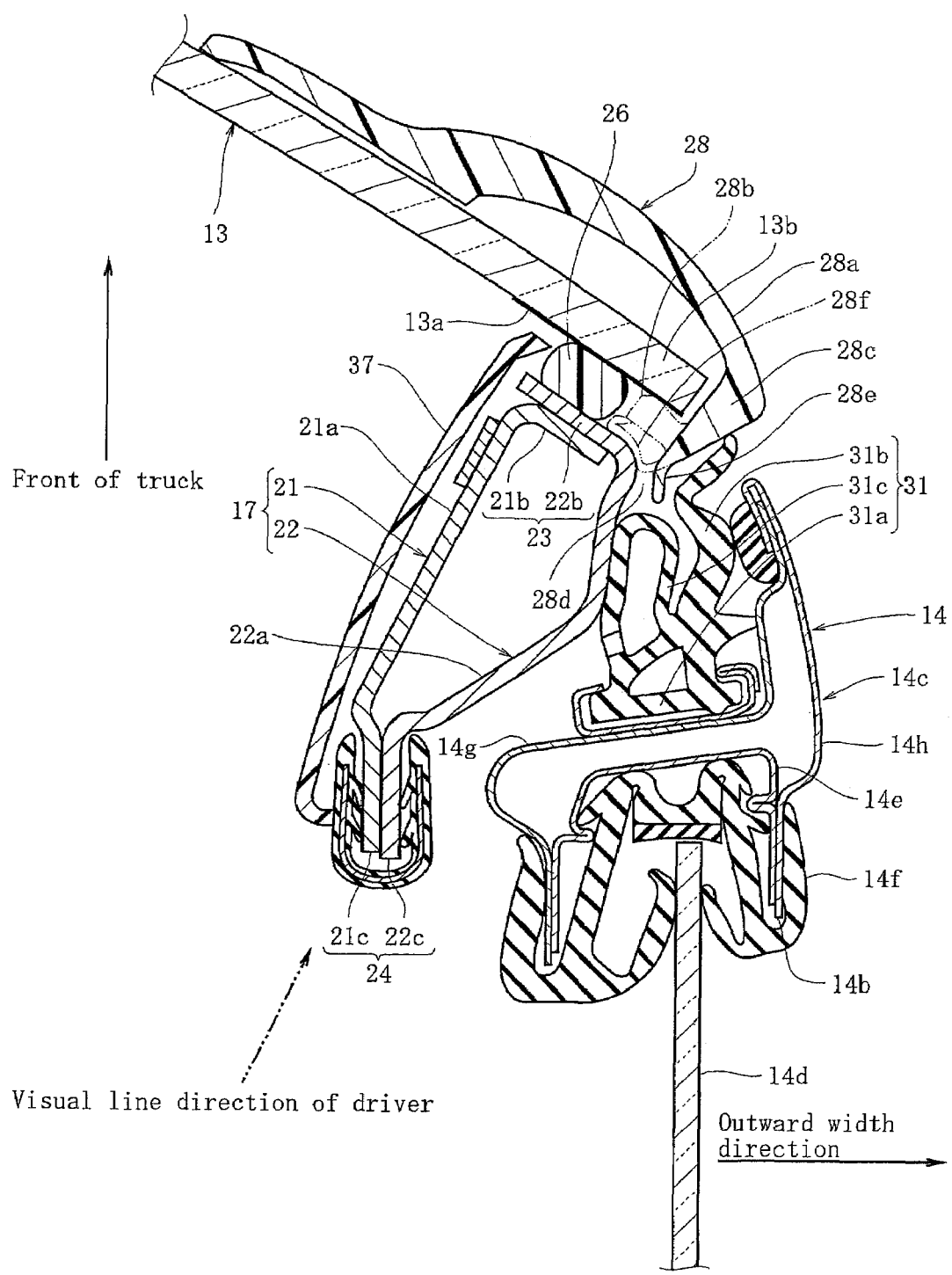
FIG. 2 is a B-B sectional view of FIG. 8.
Figure 8:
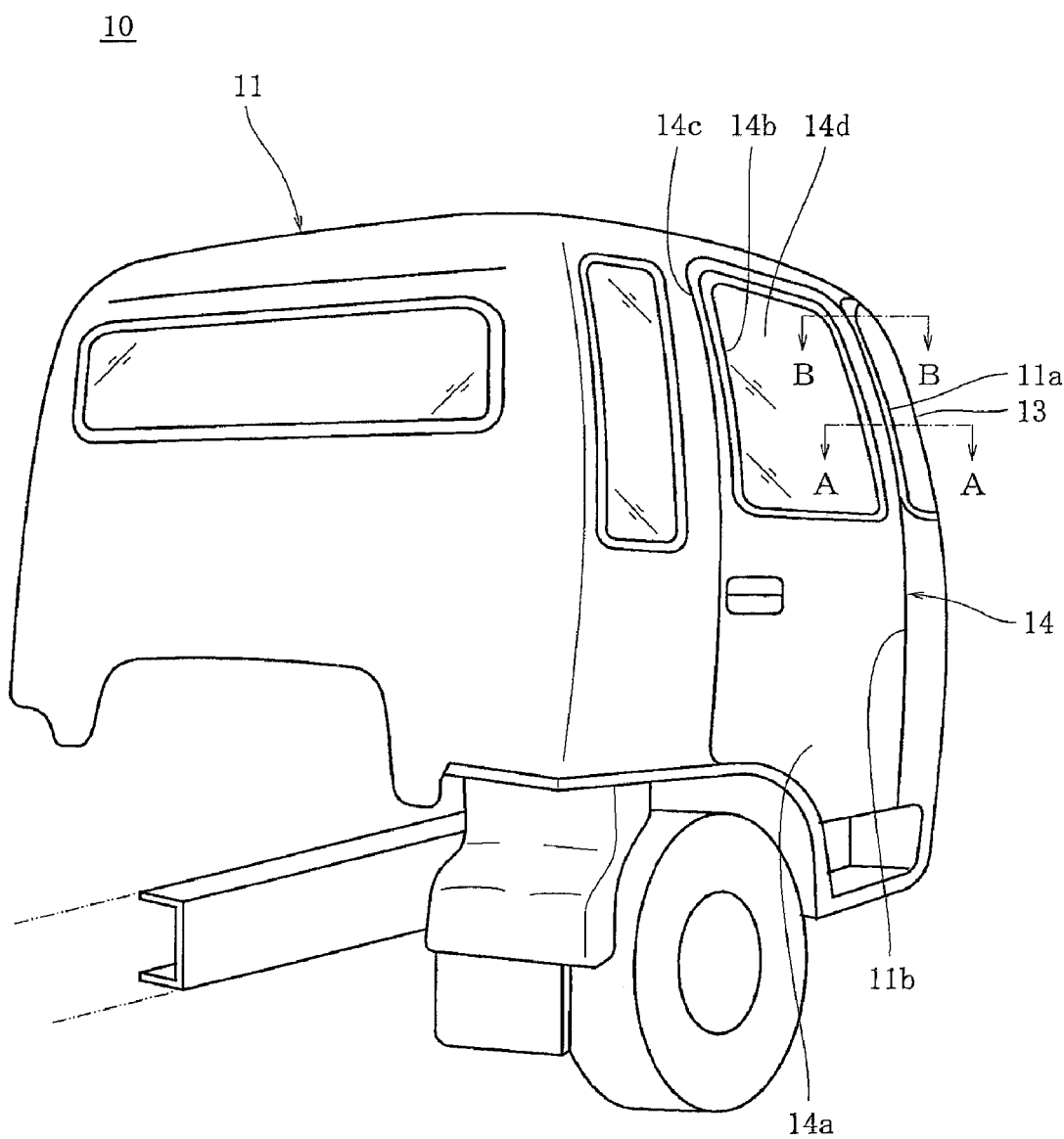
FIG. 8 is a perspective view of an essential part of a truck including a side door, the molding and the windshield glass.

As shown in FIG. 8, a driver's seat in which a driver is seated is provided on the right side of a cab 11 of a truck 10, and a front opening 11a on the front face of the cab 11 is closed by a transparent windshield glass 13. Also, a side opening 11b through which the driver gets on/off the vehicle is provided on the side face on the driver's seat side of the cab 11, and this side opening 11b is closed by a side door 14, capable of being kept open (FIGS. 1, 2 and 8). Between the side portion of the windshield glass 13 and the front portion of the side door 14, a front pillar 17 is provided extending along the side portion of the glass 13 and the front portion of the door 14. This front pillar 17 is formed in a cylindrical shape extending substantially in the vertical direction, for example, by bonding both side portions of a pillar inner panel 21 and both side portions of a pillar outer panel 22. By this, the cross section of the front pillar 17 is formed in a closed section. In this embodiment, the side door and the front pillar on the driver's seat side will be described, but the present invention may be applied to the side door and the front pillar on the passenger seat side. Also, the present invention may be applied to a vehicle such as a truck in which a driver's seat is provided on the left side.

The pillar inner panel 21 comprises a pillar inner body 21a provided along the visual line direction of the driver seated in the driver's seat of the truck 10, a front inner flange 21b formed integrally with the pillar inner body 21a on the front portion of the pillar inner body 21a, and a rear inner flange 21c formed integrally with this pillar inner body 21a on the rear portion of the pillar inner body 21a (FIGS. 1 and 2). The front inner flange 21b is provided inside the cab 11 with a predetermined gap from the inner surface of the windshield glass 13 and extending substantially in parallel with the inner surface of the windshield glass 13 toward the side portion of the windshield glass 13. That is, it is provided extending in the direction approaching to a door frame 14c of the side door 14. Also, the rear inner flange 21c is provided inside the cab 11 with a predetermined gap from the inner surface of the door frame 14c and extending substantially in parallel with the inner surface of the door frame 14c rearward.

The pillar outer panel 22 comprises a pillar outer body 22a provided substantially opposite to the front face of the door frame 14c, a front outer flange 22b formed integrally with this pillar outer body 22a on the front portion of the pillar outer body 22a, and a rear outer flange 22c formed integrally with this pillar outer body 22a on the rear portion of the pillar outer body 22a. The front outer flange 22b is provided inside the cab 11 with a predetermined gap from the inner surface of the windshield glass 13 and extending substantially in parallel with the inner surface of the windshield glass 13 and in the direction opposite to the side portion of the windshield glass 13. That is, it is provided extending in the direction away from the door frame 14c. The rear outer flange 22c is provided inside the cab 11 with a predetermined gap from the inner surface of the door frame 14c and extending substantially in parallel with the inner surface of the door frame 14c rearward.

A front overlap portion 23 is formed by bonding the pillar outer surface of the front inner flange 21b and the pillar inner surface of the front outer flange 22b, and a rear overlap portion 24 is formed by bonding the pillar inner surface of the rear inner flange 21c and the pillar inner surface of the rear outer flange 22c (FIGS. 1 and 2). The front overlap portion 23 is provided along the inner surface of the side portion of the windshield glass 13. Thus, the front pillar 17 is constructed so as to be covered with the windshield glass 13. Also, a blind film 13a (FIGS. 1 to 3) with a predetermined width is formed by ceramic coating on the inner surface of the outer periphery portion of the windshield glass 13, and the inner surface of the side portion 13b of the windshield glass 13 is bonded to the pillar outer surface of the front overlap portion 23 by an adhesive 26 for glass. By this, since the adhesion surface of the windshield glass 13 is made in a double structure of the front inner flange 21b and the front outer flange 22b, rigidity of the adhesion surface of the glass 13 can be improved, and the adhesive 26 for glass and the front pillar 17 can not be visually recognized since they are shielded by the blind film 13a when the truck is seen from the front.

An upper molding 29 made of a synthetic resin is fitted to the upper portion 13c of the windshield glass 13, and a side molding 28 made of a synthetic resin is fitted to the side portion 13b of the windshield glass 13 (FIGS. 1 and 3 to 6). The end portion of the upper molding 29 (left end portion in FIG. 5) is connected to and integrated with the upper end portion of the side molding 28. It is preferable that portions with the same cross sectional shape along the longitudinal direction in the upper molding 29 and the side molding 28 are formed by extrusion of soft synthetic resin or rubber. Also, it is preferable that the portion whose sectional shape is changed in the upper molding 29 and the side molding 28, that is, the connection portion between the upper molding 29 and the side molding 28 is formed by injection molding of the soft synthetic resin or rubber. As shown in FIGS. 4 to 7, the side molding 28 has a side outer portion 28a covering the outer surface of the side portion 13b of the windshield glass 13, a side inner portion 28b covering the inner surface of the side portion 13b of the windshield glass 13, and the side connection portion 28c connecting the side outer portion 28a and the side inner portion 28b and covering the end face of the side portion 13b of the windshield glass 13. As shown in FIG. 1, an angle $\theta_1$ made by the visible line of the side connection portion 28c in the cross section of the side connection portion 28c and a horizontal line extending in the vehicle width direction is set so as to be smaller than an angle $\theta_0$ made by a straight line in parallel with the outer surface of the side portion 13b of the windshield glass 13 and the horizontal line. If the angle $\theta_1$ is not smaller than the angle $\theta_0$, possibly there occurs a problem that the door frame 14c interferes with the side connection 28c when the side door 14 is opened/closed, and a wind noise is increased during driving.

Figure 5:
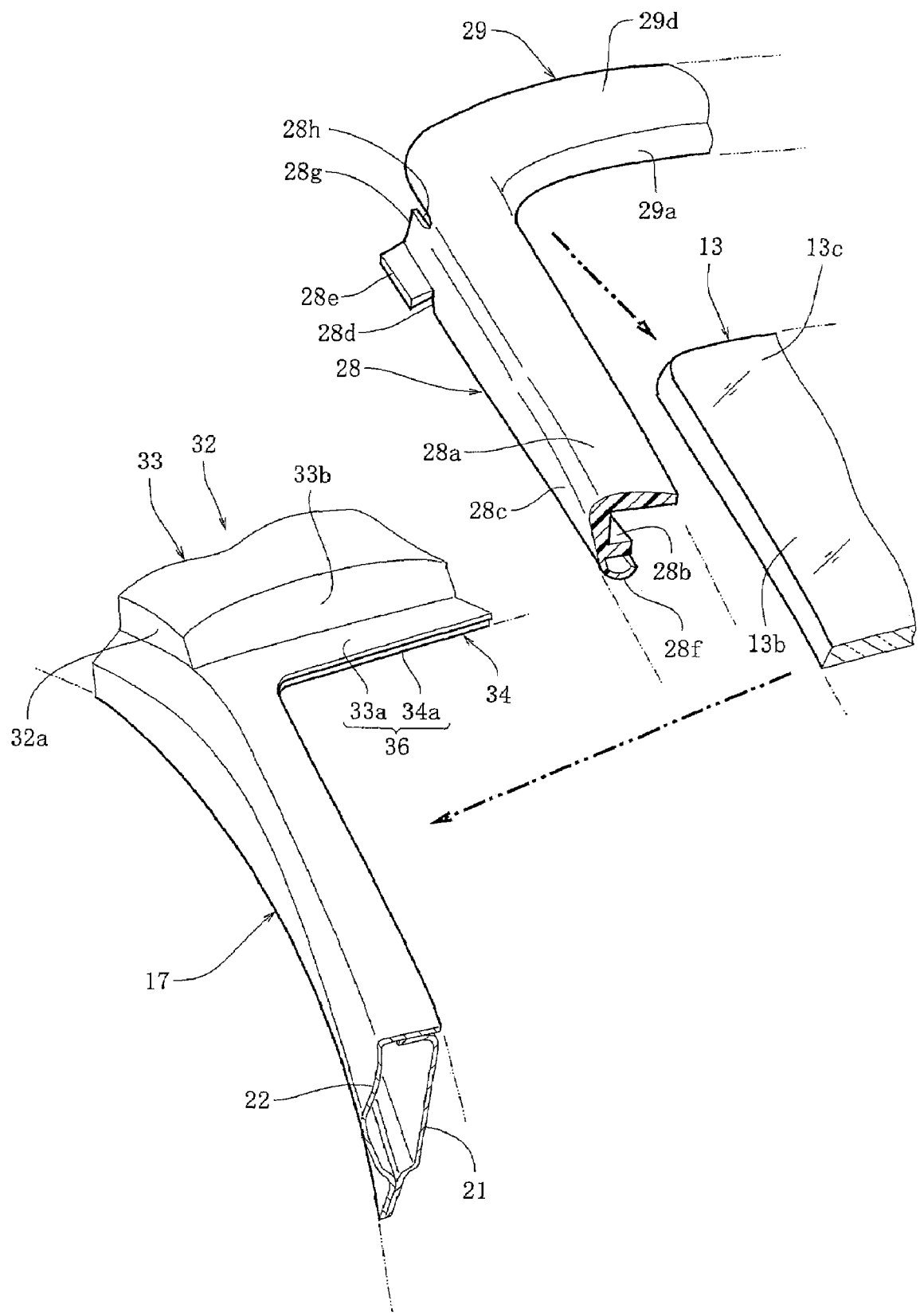
FIG. 5 is an exploded perspective view of an essential part including a front pillar, the molding and the windshield glass.
Figure 6:
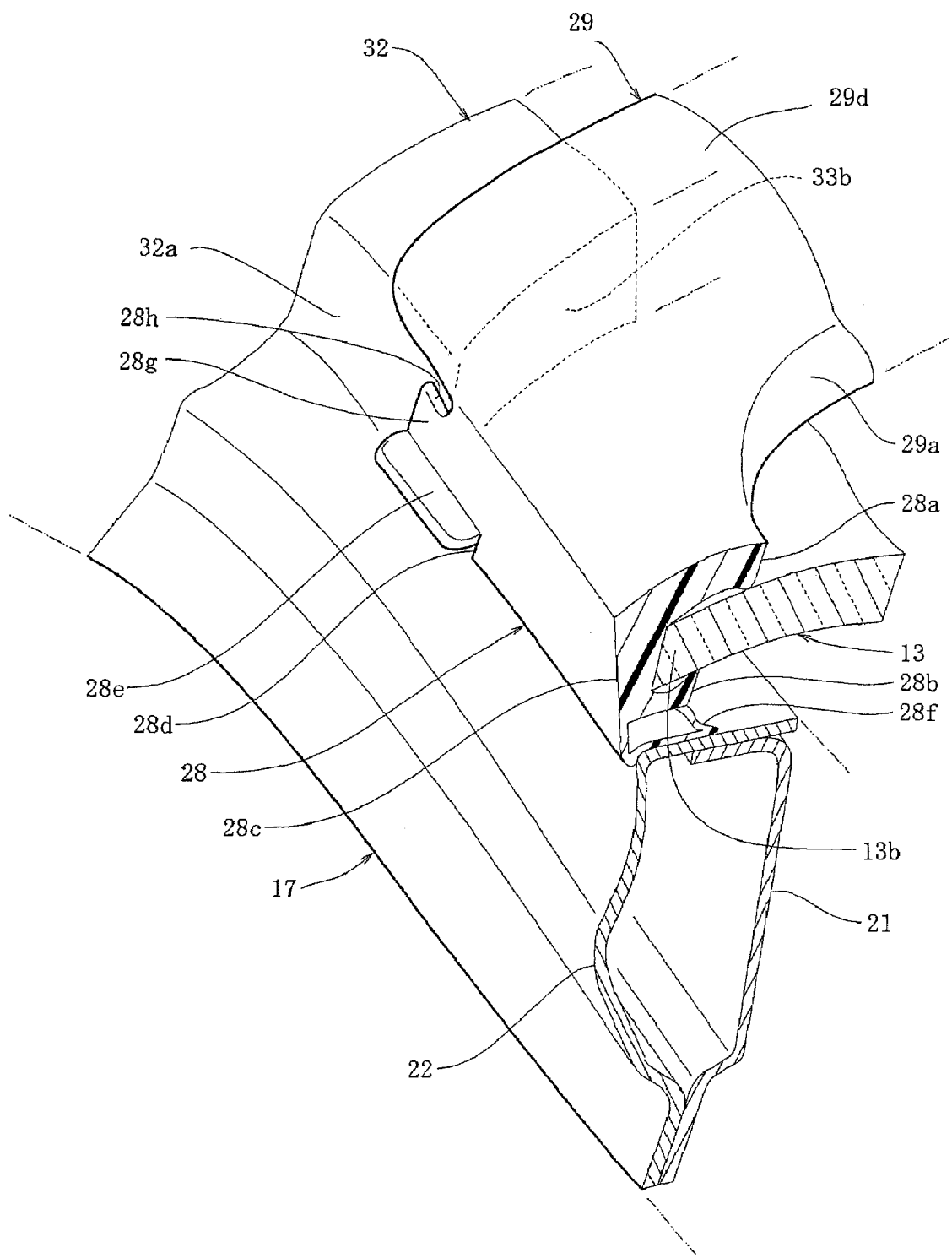
FIG. 6 is a perspective view of an essential part illustrating a state where the windshield glass in which the molding is fitted to the outer periphery portion is assembled to the front pillar.
Figure 7:
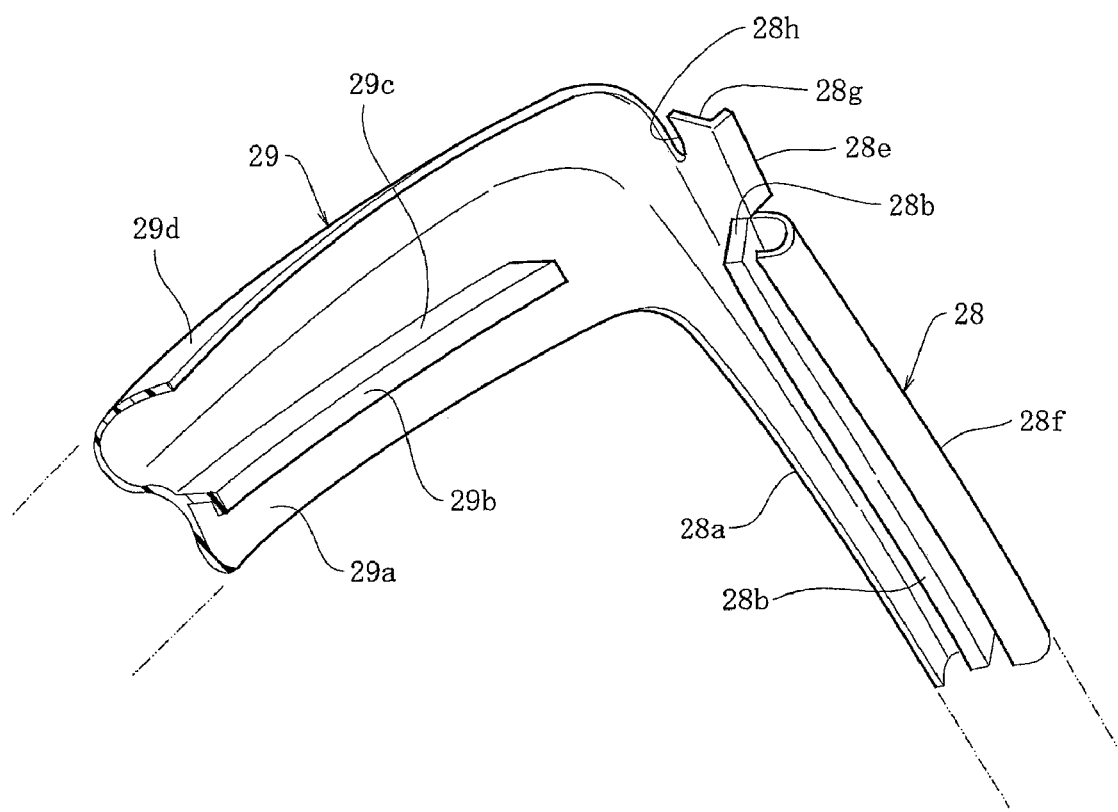
FIG. 7 is a perspective view of an essential part illustrating a state of the molding seen from the back face.

At the upper end of the side connection portion 28c, the extension piece 28g along the side surface 32a of a roof member 32 is provided (FIGS. 5 and 6). This extension piece 28g is formed so as to smoothly connect the upper end of the side connection portion 28c with the side surface 32a of the room member 32. It is preferable that this extension piece 28g is formed integrally with the side connection portion 28c from the same material as that of the side connection portion 28c. Also, there is provided an easily flexible portion 28h for giving flexibility to the extension piece 28g. This easily flexible portion 28h is a cutaway portion provided between the side portion of the upper molding 29 and the front portion of the extension piece 28g in this embodiment. Moreover, a water drain hole 28d is formed at the upper end of the side molding 28 by cutting out the side inner portion 28b (FIGS. 2 and 5 to 7). A visor portion 28e is projectingly provided from the rear portion of the side connection portion 28c constituting the side portion of the water drain hole 28d to the rear portion of the extension piece 28g. It is preferable that this visor portion 28e is formed integrally with the side connection portion 28c and the extension piece 28g from the same material as that of the side connection portion 28c and the extension piece 28g. Also, the visor portion 28e is provided so as to project toward the side door 14. Thusly, the visor portion 28e is constructed so as to obstruct a visual recognition of the water drain hole 28d from the outer side of the vehicle.

At the side inner portion 28b, a hollow shape portion 28f brought into contact with the front pillar 17 is provided along the longitudinal direction of the side inner portion 28b (FIGS. 1, 2 and 4 to 7). It is preferable that this hollow shape portion 28f is formed integrally with the side inner portion 28b from the same material as that of the side inner portion 28b. Also, the hollow shape portion 28f is formed with the cross section substantially in the J-shape (FIG. 4) at the time of molding and constructed so that the cross section is elastically deformed substantially in the flat ring shape (FIGS. 1 and 6) when brought into the front pillar 17, and preferably, it is formed with a relatively thickness of 0.5 to 2 mm, for example. By bringing the hollow shape portion 28f into contact with the front pillar 17, a gap between the side molding 28 and the front pillar 17 is closed.

Figure 3:
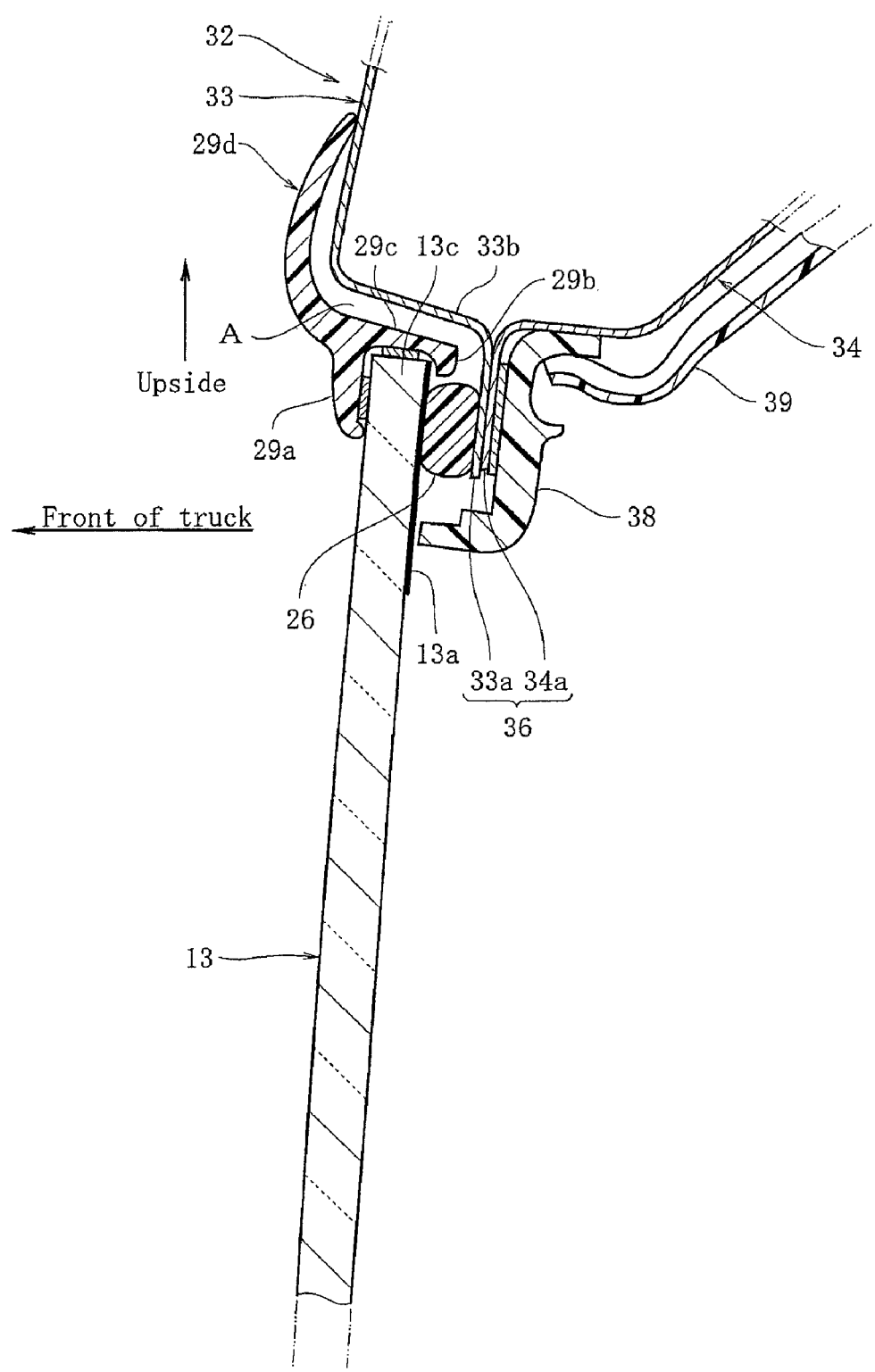
FIG. 3 is a longitudinal sectional view of an upper part of a cab front face including an upper molding and a windshield glass.
Figure 4:
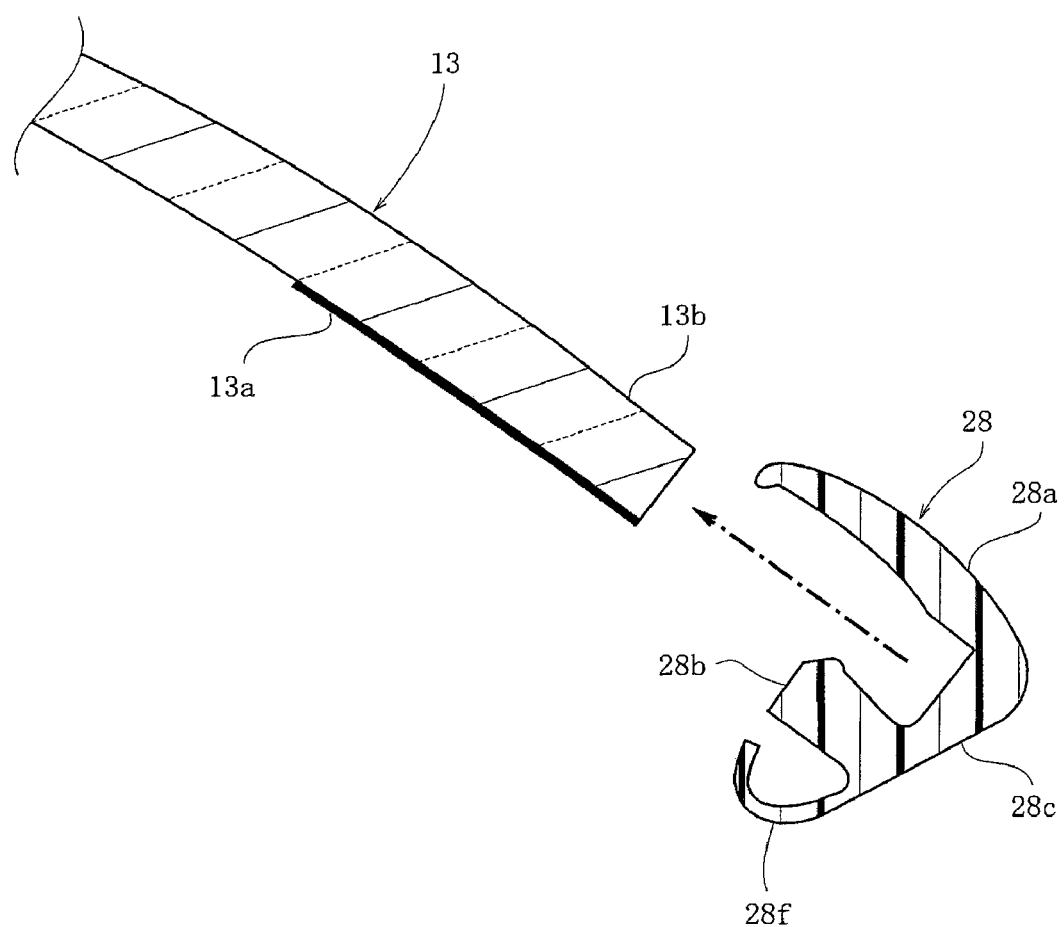
FIG. 4 is a sectional view of an essential part illustrating a state immediately before a side molding is fitted to the side portion of the windshield glass.

On the other hand, as shown in FIGS. 3, 5 and 6, the upper end of the front pillar 17 is connected to the roof member 32, and an upper overlap portion 36 along the upper portion of the windshield glass 13 is provided at the front portion of the roof member 32. Specifically, the roof member 32 has a roof outer panel 33 and a roof inner panel 34. At the front portion of the roof outer panel 33, a roof outer flange 33a is provided, while at the front portion of the roof inner panel 34, a roof inner flange 34a is provided, and the flanges 33a and 34a are bonded to each other so as to constitute the upper overlap portion 36. On the outer surface of the upper overlap portion 36, the inner surface of the upper portion 13c of the windshield glass 13 is bonded by the glass adhesive 26 (FIG. 3). By this, the glass adhesive 26 and the upper overlap portion 36 are shielded by the blind film 13a and cannot be visually recognized from the front of the truck. Also, the upper molding 29 fitted to the upper portion 13c of the windshield glass 13 has an upper outer portion 29a covering the outer surface of the upper portion 13c of the windshield glass 13, an upper inner portion 29b covering the inner surface of the upper part 13c of the windshield glass 13, an upper connection portion 29c connecting the upper outer portion 29a and the upper inner portion 29b to each other and covering the end face of the upper portion 13c of the windshield glass 13, and an upper cover portion 29d provided along the connection portion between the upper outer portion 29a and the upper connection portion 29c and having the upper end brought into contact with the outer surface of the roof outer panel 33. With this upper cover portion 29d, a gap between a stepped portion 33b of the roof outer panel 33 and the upper portion of the windshield glass 13 is covered. Moreover, the lower end of the front pillar 17 is connected to a cowl member (not shown), and a lower flange (not shown) along the lower part of the windshield glass 13 is provided at the upper part of the cowl member.

On the other hand, the side door 14 comprises a door body 14a, the door frame 14c provided on the upper face of this door body 14a and formed substantially in the inverted U-shape so as to form a door window 14b, and a transparent side glass 14d closing the door window 14b capable of being kept open (FIGS. 1, 2 and 8). The front portion of the side glass 14d is surrounded by a glass run 14f, and the glass run 14f is attached to a glass frame 14e so as to hold and guide the side glass 14d (FIGS. 1 and 2). Also, the door frame 14c is formed by bonding a door inner panel 14g and a door outer panel 14h. And the glass frame 14e is attached by insertion to the door frame 14c, and between this door frame 14c and the right side portion of the windshield glass 13, the front pillar 17 is provided along the right side portion of the windshield glass 13 and the front potion of the side glass 14d. At the front portion of the side door 14, that is, at the door inner panel 14g, a door weather strip 31 to be brought into contact with the front pillar 17 and the side molding 28 is provided. This door weather strip 31 comprises a weather strip body 31a mounted on the front surface of the door inner panel 14g, a main seal portion 31b provided integrally with this weather strip body 31a substantially in the wave-plate shape to be brought into contact with the side molding 28, and a cylindrical auxiliary seal portion 31c provided integrally with the weather strip body 31a and to be brought into contact with the front pillar 17. Reference numeral 37 in FIGS. 1 and 2 is a pillar garnish provided along the pillar outer surface of the pillar inner body 21a, and reference numeral 38 in FIG. 3 is a roof garnish covering the surface of the upper overlap portion exposed in the cab. Reference numeral 39 in FIG. 3 is a roof trim covering the surface of the roof inner panel exposed in the cab.

Action of the front structure of the truck 10 constructed as above will be described.

Since the main seal portion 31b of the door weather strip 31 is brought into contact with the side connection portion 28c of the side molding 28, dusts and the like having intruded into the gap between the side molding 28 and the door frame 14c are blocked by the main seal portion 31b of the door weather strip 31 and do not intrude into the gap between the front pillar 17 and the door frame 14c. As a result, the exposed surfaces of the front pillar 17 and the door frame 14c hardly get dusty. Also, since the door weather strip 31 is brought into contact with the side connection portion 28c of the side molding 28 made of a synthetic resin. Therefore, if the surface of at least only the side connection portion 28c is made smooth, the adhesion is made favorable, and the sealing performance can be improved. Also, since the gap between the front pillar 17 and the door frame 14c is sealed doubly not only by the main seal portion 31b but also by the auxiliary seal portion 31c of the door weather strip 31, intrusion of dusts and the like into the cab 11 can be surely prevented. Moreover, since the visible outline of the side connection portion 28c in the cross section of the side connection portion 28c is set at a predetermined angle, that is, at a predetermined angle $\theta_1$ (FIG. 1), the gap between the side connection portion 28c and the door frame 14c is made smaller. As a result, a wind noise during driving can be reduced, and interference of the door frame 14c with the door connection portion 28c at opening/closing of the side door 14 can be prevented.

On the other hand, since the upper end of the side connection portion 28c of the side molding 28, which is a seal surface of the main seal portion 31b of the door weather strip 31, and the side surface 32a of the roof member 32 are smoothly connected by the extension piece 28g (FIG. 6), the appearance of the upper end of the side molding 28 can be improved when the side door 14 is open, and since the seal line of the door weather strip continues, the sealing performance of the door weather strip 31 can be also improved. Also, covering a gap A between the upper connection portion 29c of the upper molding 29 and the stepped portion 33b of the roof outer panel 33 with the extension piece 28g of the side molding allows improvement in the appearance and the sealing performance. Moreover, since the cut-out notch 28h is provided between the side portion of the upper molding 29 and the front portion of the extension piece 28g, the extension piece 28g can be easily bent. As a result, since the extension piece 28g can easily follow the side surface 32a of the roof member 32, the sealing performance of the door weather strip 31 can be further improved.

If high-pressure water used for car wash or the like is directed to the gap between the side portion of the windshield glass 13 and the front portion of the side door 14, the high-pressure water might elastically deform the door weather strip 31 and intrude between the front pillar 17 and the door frame 14c. However, since this intruded high-pressure water can be blocked by the auxiliary seal portion 31c of the door weather strip 31, it will not intrude into the cab 11. Even if the high-pressure water is directed to the water drain hole 28d, the high-pressure water is blocked by the visor portion 28e and the extension piece 28g and does not introduce into the water drain hole 28d but its direction is changed to between the main seal portion 31b and the auxiliary seal portion 31c along the visor portion 28e. As a result, the high-pressure water does not flow back into the gap between the upper molding 29 and the roof member 32 through the water drain hole 28d. Moreover, even if the side door 14 is opened, the water drain hole 28d is shielded by the visor portion 28e and the extension piece 28g. Therefore, deterioration of the appearance of the side molding 28 can be prevented when the side door 14 is open.

Also, in this embodiment, the cut-out notch is exemplified as the easily flexible portion for giving flexibility to the extension piece, but the easily flexible portion may be a thin portion provided between the side portion of the upper molding and the front portion of the extension piece. This easily flexible portion may be provided at a part of the extension piece, not over the entire length of the extension piece, as long as it can make the extension piece easily follow the side surface of the roof member, and it may also be provided at the center of the extension piece, not between the side portion of the upper molding and the front portion of the extension piece. Moreover, if the easily flexible portion is made as a thin portion, the appearance of the side molding can be improved and the sealing performance of the door weather strip can be enhanced as compared with the case of the cut-out notch.

What is claimed is:

1. A front structure of a vehicle comprising a front pillar (17) between a side portion of a windshield glass (13) and a front portion of a side door (14), an upper resin molding (29) fitted to an upper portion (13c) of the windshield glass (13), a side resin molding (28) fitted to a side portion (13b) of the windshield glass (13), the inner surface of the side portion (13b) of the windshield glass (13) being bonded to the front pillar (17), wherein
    a door weather strip (31) along the front part of the side door (14) for contacting the side molding (28).

2. The front structure of a vehicle of claim 1, wherein the side resin molding (28) has a side outer portion (28a) covering an outer surface of the side portion (13b) of the windshield glass (13), a side inner portion (28b) covering an inner surface of side portion (13b) of the windshield glass (13), and a side connection portion (28c) covering an end face of the side portion (13b) of the windshield glass (13), wherein
    the door weather strip (31) is constructed for contacting the side connection portion (28c) of the side molding (28).

3. The front structure of a vehicle of claim 2, wherein an angle ($\theta_1$) is formed by a visible outline of the side connection portion (28c) in a cross section of the side connection portion (28c) and a horizontal line extending in the direction of the vehicle width, said angle ($\theta_1$) being smaller than an angle ($\theta_2$) formed by a straight line in parallel with the outer surface of the side portion (13b) of the windshield glass (13) and the horizontal line extending in the direction of the vehicle width.

4. The front structure of a vehicle of claim 1, wherein the door weather strip (31) has a main seal portion (31b) to be brought into contact with the side molding (28) and an auxiliary seal portion (31c) to be brought into contact with the front pillar (17).

5. The front structure of the vehicle of claim 2, wherein a roof member (32) is bonded to an upper end of the front pillar (17), an extension piece (28g) along a side surface (32a) of the roof member (32) is provided at an upper end of the side connection portion (28c) of the side molding (28), and the extension piece (28g) is formed so that the upper end of the side connection portion (28c) smoothly connects to the side surface (32a) of the roof member.

6. The front structure of a vehicle of claim 5, which further comprises a flexible portion (28h) to provide flexibility to the extension piece (28g) which consists of a cutaway portion or a thin portion provided between the side portion of the upper molding (24) and the front portion of the extension piece (28g).

\* \* \* \* \*